Figure 1:
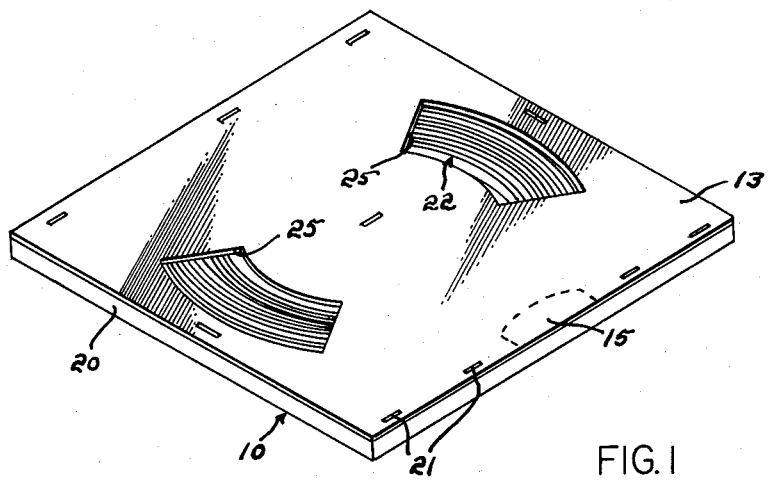

Dec. 24, 1963  R. C. NASH  3,115,243
PACKAGING OF BAND SAW BLADES

Filed May 5, 1961  2 Sheets-Sheet 1

INVENTOR.
RALPH C. NASH
BY
ATTORNEY

Dec. 24, 1963   R. C. NASH   3,115,243
PACKAGING OF BAND SAW BLADES
Filed May 5, 1961   2 Sheets-Sheet 2
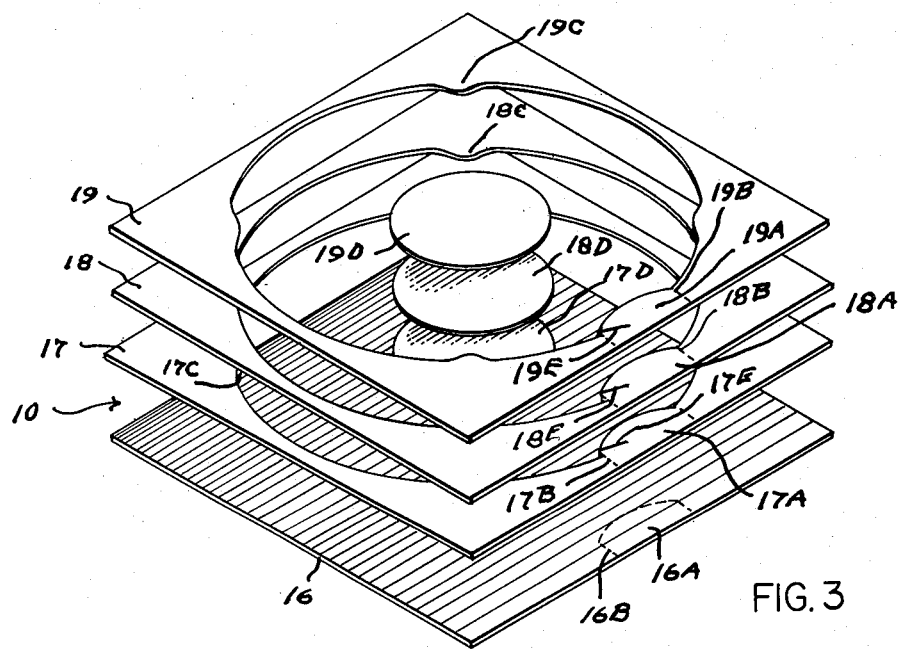
FIG. 3
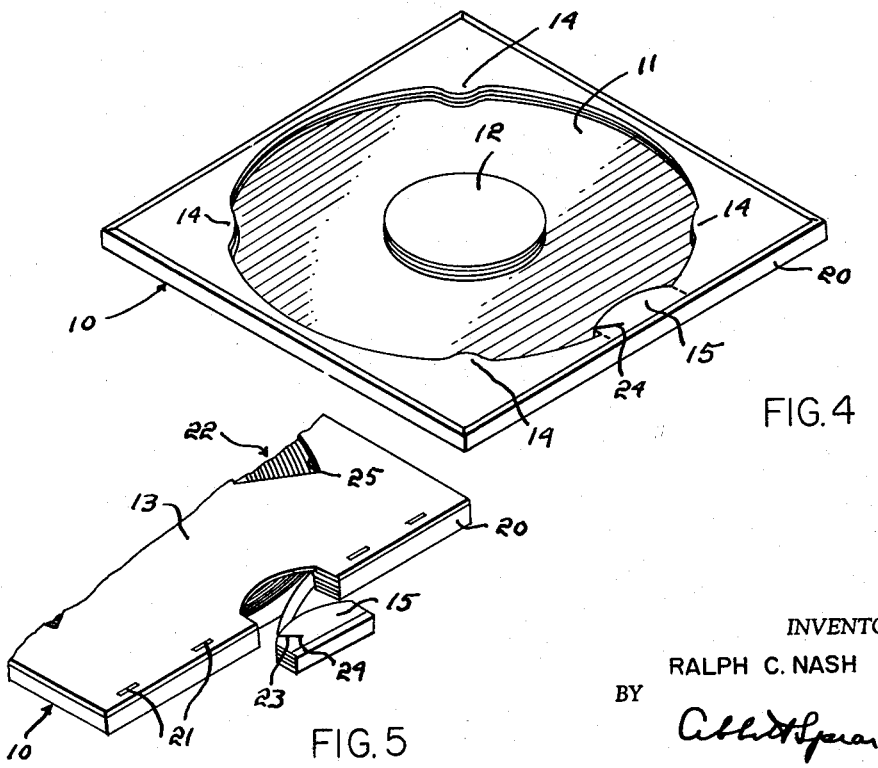
FIG. 4
FIG. 5
INVENTOR.
RALPH C. NASH
BY
ATTORNEY United States Patent Office 3,115,243
Patented Dec. 24, 1963

1

3,115,243
PACKAGING OF BAND SAW BLADES
Ralph C. Nash, 61 Manchester St., Nashua, N.H.
Filed May 5, 1961, Ser. No. 108,042
2 Claims. (Cl. 206—52)

The present invention relates to packaged band saw blades and to containers for use in packaging them.

Band saw blades are sold in coils, each of a predetermined length, from which shorter lengths are cut. It is essential that the compactly wound coils be so packaged that, while they are securely confined, the outer end of the coiled blade be capable of being pulled to so unwind the coil as to enable such shorter lengths to be removed.

The principal objective of this invention is to provide containers and blade packages that not only satisfy the above requirements but also enable the packages to be readily opened with each blade then having its end exposed and provided with a knob-like portion, thus enabling the still packaged blade to be gripped and pulled to unwind a desired length of blade with maximum ease and convenience.

In accordance with the invention, this result is attained by providing a container, for such coiled articles as band saw blades, that comprise a base having a recess in one face dimensioned to receive a predetermined blade length when wound into a coil of a predetermined outside diameter, and a cover secured to the recessed face of the base. The container includes a break-away portion which includes a section of the wall defined by the blade-receiving recess and the outer end of the blade is anchored to the break-away portion so that, when the container is broken open, the outer end of the blade is exposed but has a knob-like end which facilitates the unwinding of the coiled blade.

In the accompanying drawings, there is shown an illustrative embodiment of the invention from which these and other of its objectives, novel features, and advantages will be readily apparent.

Figure 2:
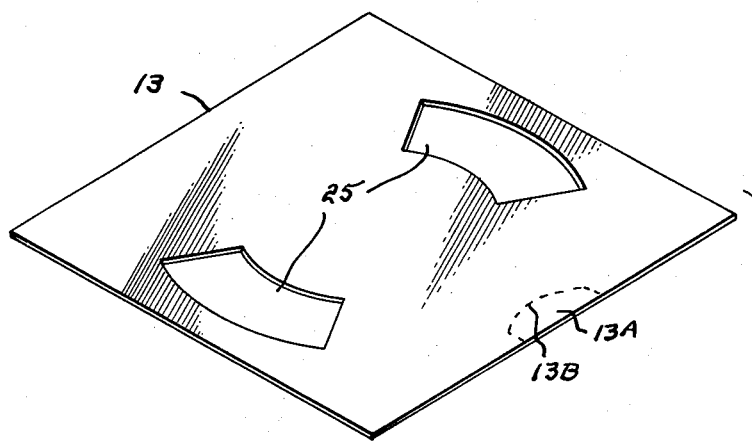
Figure 2:
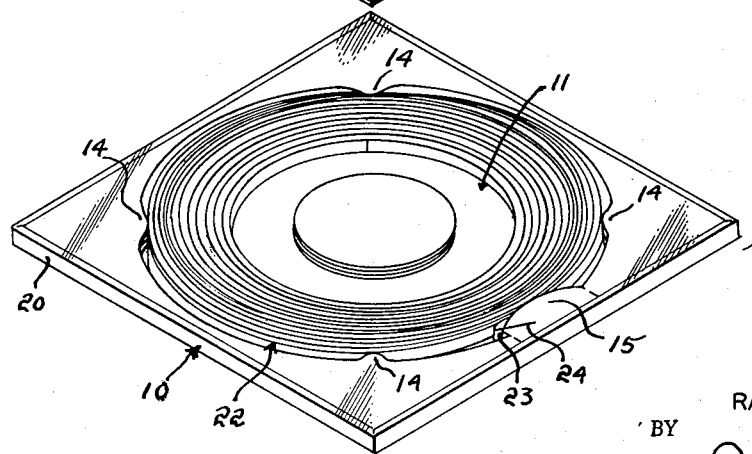

In the drawings:

FIG. 1 is a top perspective view of a band saw blade package in accordance with the invention, FIG. 2 is a like view of the package but with its cover removed, FIG. 3 is an exploded, perspective view of the base of the container, FIG. 4 is a top, perspective view of the assembled container base, and FIG. 5 is a fragmentary perspective view of a package with the break-away portion of the container broken free and available for use in unwinding the band saw coil.

A container, in accordance with the invention, consists of a generally indicated base 10 having a recess 11 and a hub 12 centrally thereof, and a cover 13. The wall of the recess 11 has a plurality of spaced, inwardly disposed projections 14 and a break-away portion 15 shown as projecting inwardly of the recess 11 to a greater extent than the projections 14.

The base 10 is a laminate and is shown, see FIG. 3, as comprising a bottom layer 16 and superimposed layers 17, 18 and 19 which are centrally apertured to establish the recess 11 and the projections on its wall. The parts

2 of the several layers that establish the break-away portion 15 are indicated at 16A, 17A, 18A, and 19A and these are defined by score lines 16B, 17B, 18B, and 19B, respectively. The parts of the layers 17, 18, and 19 that establish the projections 14 are indicated, in FIG. 3, at 17C, 18C, and 19C, respectively. The base is completed by an edge cover 20 and the hub 12 is shown as a laminate comprising layers 17D, 18D, and 19D and all layers and the cover 13, as well, are shown as of the same thickness. The cover 13 has a portion 13A which, when the cover is attached to the base 10 as by staples 21, becomes a part of the break-away portion 15 and is defined by score lines 13B, see FIG. 2.

A coil of a predetermined length of band saw blades is indicated generally at 22 and it is shown as having an inside diameter receiving the hub 12 and an outside diameter enabling it to be seated in the recess 11. It will be appreciated that the resiliency of the blade stock results in the coil pressing outwardly and that, were it not for the fact that the contact of the blade with the wall of the recess 11 is limited to the projections thereof, the frictional resistance to the unwinding of the blade would be objectionably great. In this connection, reference is again made to the fact that the portion 15 projects into the recess 11 to a greater extent than the projections 14 and thus prevents contact of the periphery of the coil 22 with the two projections 14 next to it. Without this arrangement, shaking of the coil, such as is inevitable in transit, would unavoidably result in the coil becoming frictionally jammed against the engaged projections, as the teeth of adjacent turns become so caught, because of their set, that neither winding nor unwinding can be effected without considerable difficulty. By providing the package with a portion 15, the blade, when the portion 15 is broken away, is sufficiently freed so that the teeth disengage as the coil 15 expands.

It will also be noted that the outer end of the coil 22 is doubled back to establish a hook 23 and that the break-away portion 15 has a slot 24 opening into the recess 11 to define a hook-receiving catch.

After the coil 22 has been placed in the recess 11 of a container base 10 and its hook 23 caught in the slot 24 of its portion 15, the cover 13 is attached to complete the package with parts of the coil 22 being visible through windows 25 in the cover 13. The cuts in the layers 17, 18, 19 that establish the slot 24 are indicated in FIG. 3 at 17E, 18E, and 19E, respectively. When it is desired to open the package, the portion 15 is broken away from the container and it becomes a pull-knob on the exposed end of the coil 22 enabling it to be quickly and easily unwound to the desired extent. In addition to function of the break-away portion in freeing the coil so that it may be readily unwound and in providing a knob on the outer end of the blade for use in so doing, it exposes peripheral turns of the coil thus to enable the remaining blade length to be more easily estimated.

I claim:

1. In a container for a coiled length of a resilient article such as a band saw blade, a base having a recess in one face dimensioned to receive a predetermined blade length when wound into a coil of predetermined outside diameter, said recess defining a wall, said wall including a plurality of inwardly disposed projections, said base including a break-away portion including one of said projections and defined by score lines, the break-away section having an anchoring slot for the outer end of such a coil.

2. In a container for a coiled length of a resilient article such as a band saw blade, a base having a recess in one face dimensioned to receive a predetermined blade length when wound into a coil of predetermined outside diameter, said recess defining a wall, said wall including a plurality of inwardly disposed projections, said base including a break-away portion including one of said projections and defined by score lines, the break-away section having an anchoring slot for the outer end of such a coil, the projection defined by the break-away portion being of greater radial extent than the adjacent projection on either side of it.

References Cited in the file of this patent

UNITED STATES PATENTS

| | | |
|---|---|---|
| 2,077,570 | Lamare | Apr. 20, 1937 |
| 2,333,099 | Gerking | Nov. 2, 1943 |
| 2,459,460 | Segal | Jan. 18, 1949 |
| 2,490,732 | Hess | Dec. 6, 1949 |
| 2,796,170 | Davis | Jan. 18, 1957 |
| 2,822,084 | Eilertsen | Feb. 4, 1958 |
| 2,921,676 | Carignan | Jan. 19, 1960 |